United States Patent

Orbach et al.

[19]

[11] Patent Number: 5,911,769
[45] Date of Patent: Jun. 15, 1999

[54] HITCH ASSEMBLY CONTROL SYSTEM WITH SLIP CONTROL

[75] Inventors: Abraham Orbach, Naperville; William L. Schubert, Downers Grove, both of Ill.

[73] Assignee: Case Corporation, Racine, Wis.

[21] Appl. No.: 08/664,991

[22] Filed: Jun. 10, 1996

[51] Int. Cl.⁶ .......................... A01B 63/112; G05B 13/02
[52] U.S. Cl. ................................. 701/50; 172/7
[58] Field of Search ........................... 701/50, 82; 172/7, 172/4, 8, 2

[56] References Cited

U.S. PATENT DOCUMENTS

| | | | |
|---|---|---|---|
| 3,913,680 | 10/1975 | Carlson | 172/2 |
| 4,173,258 | 11/1979 | Boulais et al. | 172/4.5 |
| 4,221,266 | 9/1980 | Fardal | 172/4 |
| 4,263,973 | 4/1981 | Boulais et al. | 172/4.5 |
| 4,282,933 | 8/1981 | Suganami et al. | 172/4.5 |
| 4,344,499 | 8/1982 | van der Lely et al. | 180/197 |
| 4,454,919 | 6/1984 | Arnold et al. | 172/1 |
| 4,465,142 | 8/1984 | van der Lely et al. | 172/7 |
| 4,503,916 | 3/1985 | Wiegardt | 172/3 |
| 4,508,176 | 4/1985 | Wiegardt et al. | 172/7 |
| 4,518,044 | 5/1985 | Wiegardt et al. | 172/7 |
| 4,715,012 | 12/1987 | Mueller, Jr. | 364/900 |
| 4,809,785 | 3/1989 | Arnold et al. | 172/9 |
| 4,846,283 | 7/1989 | Batcheller | 172/10 |
| 4,886,123 | 12/1989 | Arnold et al. | 172/7 |
| 4,979,092 | 12/1990 | Bergene et al. | 364/148 |
| 5,082,081 | 1/1992 | Tsuyama et al. | 180/197 |
| 5,138,819 | 8/1992 | Andre | 56/10.2 |
| 5,190,111 | 3/1993 | Young et al. | 172/7 |
| 5,406,486 | 4/1995 | Kamio et al. | 364/426.03 |
| 5,421,416 | 6/1995 | Orbach et al. | 172/4 |
| 5,424,957 | 6/1995 | Kerkhoff et al. | 364/479 |
| 5,443,307 | 8/1995 | Maier | 303/169 |
| 5,523,765 | 6/1996 | Ichikawa | 342/451 |
| 5,560,431 | 10/1996 | Stratton | 172/2 |
| 5,621,643 | 4/1997 | Nakagami et al. | 364/424.07 |

FOREIGN PATENT DOCUMENTS 1503592  3/1978  United Kingdom .

OTHER PUBLICATIONS

Scott, Barry L., Borgelt, Steven C., Sudduth, Kenneth A., "Yield Determination Using An Instrumental Claas Combine", Written for presentation at the 1993 ASAE International Winter Meeting Chicago, Illinois, Dec. 14–17, 1993, Paper No. 931507.

*Primary Examiner*—Michael Zanelli
*Attorney, Agent, or Firm*—Foley & Lardner

[57] ABSTRACT

A system for controlling wheel slippage of a vehicle carrying or trailing an implement when slip above a slip limit is detected. The implement is coupled to an implement positioning system including an actuator for raising and lowering the implement in response to a control signal. The system includes a first sensor for sensing an operating parameter such as draft force or implement position, a second sensor for sensing the vehicle's apparent speed, and a third sensor for sensing the vehicle's ground speed. The system may include a fourth sensor for sensing a second operating parameter. The system also includes a control circuit configured to generate a slip signal based upon the apparent speed and the ground speed, and to operate in a first manner when the slip signal is below a slip limit and in a second manner when the slip signal is above the slip limit. When operating in the first manner, the control circuit generates the control signal for moving the actuator based upon the difference between the first or second operating parameter and a reference value. When operating in the second manner, the control circuit can override control based on this difference by using a control signal based upon the difference between the slip signal and a slip reference value.

30 Claims, 11 Drawing Sheets

SLIP ENTRY LOGIC

HITCH ASSEMBLY CONTROL SYSTEM WITH SLIP CONTROL

FIELD OF THE INVENTION

The present invention relates generally to the field of control systems for agricultural implements. More particularly, the invention relates to a system for controlling wheel slippage of a vehicle carrying or trailing an implement wherein a control signal is generated in a first manner based upon an operating parameter and in a second manner based upon the operating parameter or the amount of slip detected.

BACKGROUND OF THE INVENTION

A number of known control arrangements regulate the position or elevation of implements, such as plows, attached to or drawn by agricultural vehicles, such as tractors. Such control systems generally sense the position of a three-point hitch and compare this position to a command or reference value set by an operator. Based upon this comparison, such control systems generate a control signal for an actuator to vertically move the hitch, along with the implement mounted on it, to the desired elevation.

Known control systems can also operate based upon the draft force generated by the interaction of an implement with the ground. Such draft force can be generated by the implement penetrating the ground, or by the implement being engaged with the ground. The control system typically compares the sensed draft force to a command or reference value set by an operator and generates a control signal for an actuator to vertically move the hitch to maintain the desired draft force.

Many systems for controlling implement elevation using implement position or draft force as an operating parameter are not adapted for controlling excessive wheel slippage (i.e., slip). Typically, a tractor experiences differing magnitudes of slip as the tractor encounters different soil conditions during travel over the length of a field. Although a certain level of slip may be desired for efficient operation, excessive slippage results in inefficient operation and, if severe enough, may result in the tractor's wheels burrowing into the field and becoming stuck. To maintain an efficient level of slip, yet avoid excessive wheel slippage, an operator is often required to change the position or draft command setting of the control system to accommodate variations in slip due to varying soil conditions. However, even an experienced operator may not respond quickly enough to soil conditions which cause excessive wheel slippage.

Control systems have been proposed to automatically respond to excessive wheel slippage by controlling the elevation of the implement. Generally, such control systems determine wheel slippage as the difference between the apparent speed and the true ground speed of the tractor. Upon detecting excessive slippage (i.e., when slippage exceeds a threshold), the control system reduces wheel slippage by raising the implement, thereby reducing the draft force on the tractor and increasing the transfer of implement weight onto the tractor to improve traction. For example, U.S. Pat. No. 4,518,044 discloses a system for controlling implement position as a function of various parameters including wheel slippage. The control system combines signals corresponding to wheel slippage, engine speed error and draft load command into a combined load error signal which may be used to control an actuator. The combined load error signal causes the actuator to raise or lower the implement, thereby reducing the combined load error signal.

SUMMARY OF THE INVENTION

The present invention provides an improved system for controlling wheel slippage of a vehicle carrying or trailing an implement by controlling the elevation of the implement. The invention also provides a system for controlling wheel slippage of a vehicle by raising the implement when an excessive amount of slip is detected. The invention also provides a system for controlling wheel slippage of a vehicle carrying or trailing an implement wherein a control signal is generated in a first manner based upon an operating parameter when a slip signal is below a slip limit, and in a second manner based upon the operating parameter or the amount of slip detected when the slip signal is above a slip limit.

In accordance with one aspect, the invention relates to a system for controlling wheel slippage of a vehicle carrying or trailing an implement. The implement is coupled to an implement positioning system including an actuator for vertically moving the implement in response to a control signal. The system includes a first sensor for sensing a first operating parameter of a machine system comprising the vehicle, the implement positioning system and the implement, a second sensor for sensing apparent speed of the vehicle, and a third sensor for sensing ground speed of the vehicle. The system also includes a control circuit coupled to the first sensor, the second sensor, the third sensor and the actuator. The control circuit is configured to generate a slip signal based at least upon the apparent speed of the vehicle and the ground speed of the vehicle and to generate the control signal for moving the implement. The control circuit is further configured to operate in a first manner when the slip signal is below a first predetermined slip limit wherein control is based upon the first operating parameter and in a second manner when the slip signal is above a second predetermined slip limit wherein control is based exclusively upon either the first operating parameter or a slip override signal.

In accordance with another aspect, the invention relates to a system for controlling wheel slippage of a vehicle carrying or pulling an implement. The implement is coupled to an implement positioning system including an actuator for vertically moving the implement in response to a control signal. The system includes a draft sensor for sensing force exerted by the implement on the implement positioning system, a position sensor for sensing position of the implement, a speed sensor for sensing apparent speed of the vehicle and a ground speed sensor for sensing ground speed of the vehicle. The system also includes a control circuit coupled to the draft sensor, the position sensor, the speed sensor, the ground speed sensor and the actuator. The control circuit is configured to generate a slip signal based at least upon the apparent speed of the vehicle and the ground speed of the vehicle and to generate the control signal for moving the implement. The control circuit is further configured to operate in a normal mode wherein the control signal applied to the actuator is selectively based upon a first difference between the draft force and a draft reference value or a second difference between the implement position and a position reference value, and in a slip override mode when the slip signal exceeds a slip threshold and wherein control based upon the first or the second difference can be overridden by control based upon a difference between the slip signal and a slip reference value.

The invention also relates to a system for controlling slip of a vehicle by controlling the elevation of an implement carried or trailed by the vehicle. The implement is coupled to an implement positioning system including an actuator for vertically moving the implement in response to a control signal. The system includes means for sensing a first operating parameter of a machine system comprising the vehicle, the implement positioning system and the implement, means for sensing a second operating parameter of the machine system, means for sensing the apparent speed of the vehicle and means for sensing the ground speed of the vehicle. The system also includes control means coupled to the first operating parameter sensing means, the second operating parameter sensing means, the apparent speed sensing means, the ground speed sensing means and the actuator. The control means is configured to generate a slip signal based at least upon the apparent speed of the vehicle and the ground speed of the vehicle. The control means is further configured to generate the control signal for moving the implement selectively based upon a first difference between the first operating parameter and a first reference value or a second difference between the second operating parameter and a second reference value, and to override control based upon the first or the second difference with control based upon a difference between the slip signal and a slip reference value when the slip signal exceeds a slip threshold.

In accordance with still another aspect of the invention, a system is provided for controlling wheel slippage of a vehicle carrying or trailing an implement. The implement is coupled to an implement positioning system including an actuator for vertically moving the implement in response to a control signal. The system includes a first sensor for sensing an operating parameter of a machine system comprising the vehicle, the implement positioning system and the implement, a second sensor for sensing apparent speed of the vehicle and a third sensor for sensing ground speed of the vehicle. The system also includes a control circuit coupled to the first sensor, the second sensor, the third sensor and the actuator. The control circuit is configured to generate a slip signal based at least upon the apparent speed of the vehicle and the ground speed of the vehicle and to generate the control signal for moving the implement. The control circuit is further configured to control based exclusively upon the operating parameter if the slip signal is below a first predetermined slip limit or if the first operating parameter would result in raising the implement when the slip signal is above a second predetermined slip limit, and to control based exclusively upon the slip signal if the first operating parameter would result in lowering the implement when the slip signal is above the second predetermined slip limit.

The invention also relates to a control system for controlling a function of a machine system comprising an off-road work vehicle, a moveable device coupled to the vehicle and adapted to regulate the function and an actuator for moving the device in response to a control signal. The control system includes a sensor for sensing a parameter of the machine system, a receiving circuit for receiving sequential signals from at least one transmitting device and generating position signals representative of the position of the vehicle based upon the sequential signals, and a control circuit coupled to the sensor, the receiving circuit and the actuator. The control circuit is configured to generate a vehicle speed signal representative of vehicle speed based upon the position signals and to generate the control signal for moving the device based at least upon the parameter and the vehicle speed.

In accordance with yet another aspect, the invention relates to a system for displaying the speed of an off-road work vehicle including an engine coupled to an axle for driving the vehicle. The system includes a display, a receiving circuit for receiving sequential signals from at least one transmitting device and generating position signals representative of the position of the vehicle based upon the sequential signals, and a control circuit coupled to the display and the receiving circuit. The control circuit is configured to generate a vehicle speed signal representative of vehicle speed based upon the position signals and to generate a control signal based upon the vehicle speed, wherein the display is configured to display the vehicle speed in response to the control signal.

The invention also relates to a control system for controlling a function of a machine system comprising an off-road work vehicle, a moveable device coupled to the vehicle and adapted to regulate the function and an actuator for moving the device in response to a control signal. The control system includes a sensor for sensing a parameter of the machine system, a receiving circuit for receiving sequential signals from at least one transmitting device and generating position signals representative of the position of the vehicle based upon the sequential signals, and a control circuit coupled to the sensor, the receiving circuit and the actuator. The control circuit is configured to generate a vehicle acceleration signal representative of vehicle acceleration based upon the position signals and to generate the control signal for moving the device based at least upon the parameter and the vehicle acceleration.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to a tractor having a hitch assembly on which an implement is mounted, it should be understood that the present system is more generally applicable to regulating wheel slippage of a vehicle in general. Thus, a system employing the elements recited in the appended claims and used on other types of vehicle are equally within the intended scope of the invention.

Figure 1:
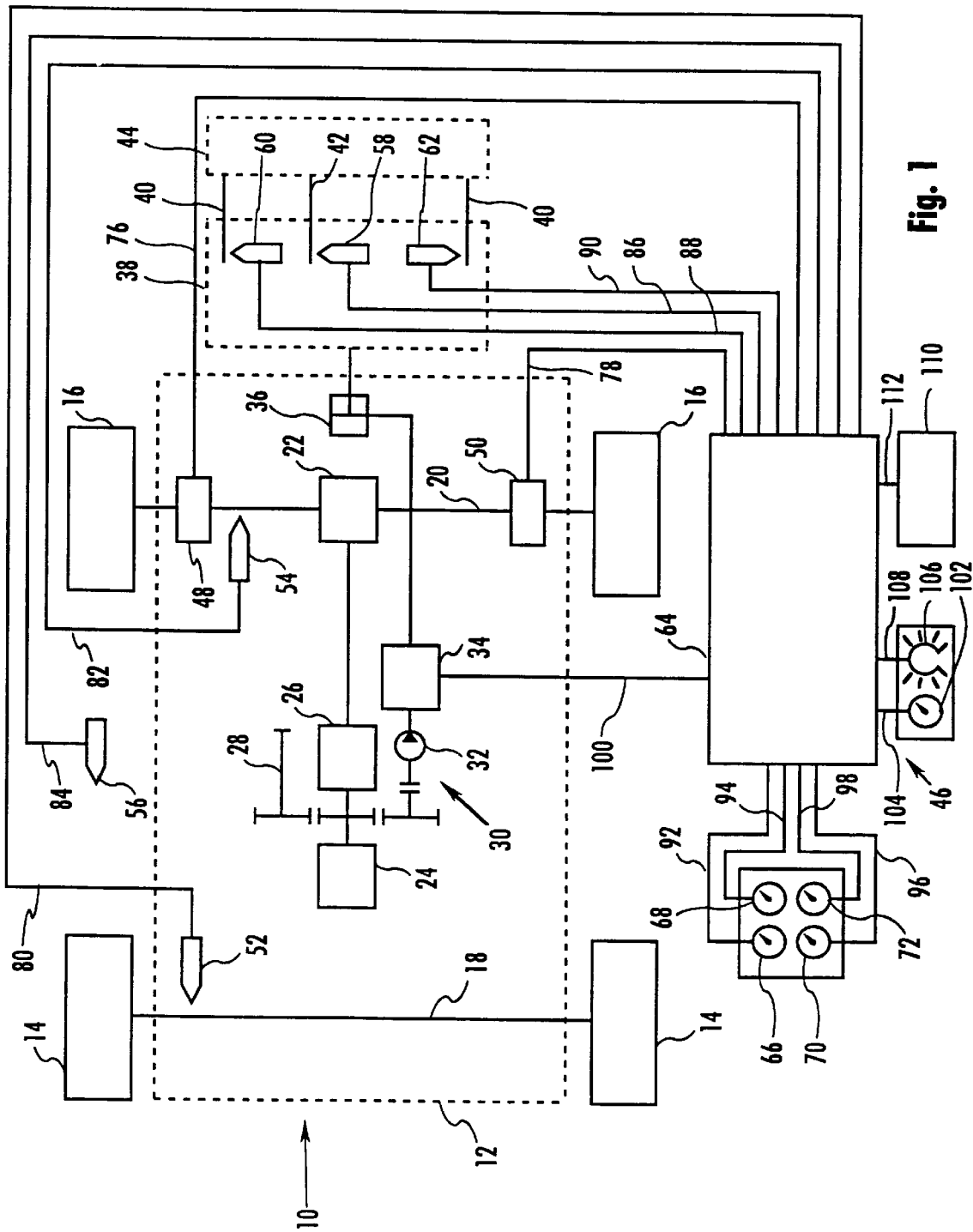
FIG. 1 is a diagrammatical representation of a tractor equipped with a control system for positioning an implement in response to a plurality of operating parameters including implement position and load.

Turning now to the FIGURES and referring first to FIG. 1, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment. A tractor generally of this type is further described in U.S. Pat. No. 5,421,416 incorporated herein by reference.

A hydraulic system 30 is coupled to engine 24 to provide a source of pressurized fluid for powering various actuators. As illustrated in FIG. 1, hydraulic system 30 includes a hydraulic pump 32 piped to a fluid reservoir (not shown) and to valving 34 for regulating and directing pressurized fluid to various hydraulic components. One such component is illustrated in FIG. 1 in the form of a linear actuator or double-acting cylinder 36 coupled to a hitch assembly 38. Hitch assembly 38 may be a conventional three-point hitch having lower and upper hitch links 40 and 42 for supporting a working implement 44, such as a plow. Moreover, valving 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked. Valving 34 can also be used to raise hitch assembly 38, along with implement 44, to a lifted position wherein the implement is not engaged in a working position with the ground. A lifted position may be commanded by the operator or control system during travel of tractor 10 across a road or between fields. Typically, the lifted position corresponds to implement 44 being in a raised position at a distance above the ground to allow implement 44 a range of movement without engaging the ground. The distance is generally sufficient to allow implement 44 to move or bounce slightly in response to influences such as bumps or depressions in the road or field without coming into contact with the ground. Moreover, a lifted position as referred to herein may situate implement 44 in a location below the fully raised position. In general, implement 44 is in a lifted position when not engaged in a working position with the ground, and certain implements may include a wheel or support (not shown) coupled to the implement that remains in contact with the ground while the implement is in a raised position.

As illustrated in FIG. 1, tractor 10 is equipped with a control system, designated generally by the reference numeral 46 for controlling the position of hitch assembly 38 and implement 44. While control system 46 may include more or fewer of the elements shown in FIG. 1, it may typically include brake sensors 48 and 50 coupled to the rear service brakes of tractor 10, speed sensors 52 and 54 coupled to the front and rear axles 18 and 20 respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70 and 72 (described below) which may be provided on a single or multiple control consoles 74 in the tractor cab (not shown).

In operation, brake sensors 48 and 50 detect the application of the tractor service brakes and generate braking signals upon application of the brakes. These braking signals are applied to control circuit 64 via conductors 76 and 78 respectively. Of course, for control systems employing control routines that do not make use of braking signals, sensors 48 and 50 may be omitted.

Speed sensors 52 and 54, which may include a variable inductance magnetic pickup sensor, detect the rotational velocity of front wheels 14 and rear wheels 16, respectively, and generate speed signals representative thereof. These speed signals are transmitted to control circuit 64 via conductors 80 and 82. A tractor 10 equipped for slip control typically includes a ground speed sensor 56 to measure the true speed of tractor 10 with respect to the ground. Sensor 56 typically includes a radar device mounted to body 12 of tractor 10. When configured with a radar, sensor 56 emits radar signals toward the ground and receives a portion of the signals rebounding from the ground to determine the ground speed of tractor 10. Sensor 56 then generates a speed signal representative of the tractor speed and transmits this signal to control circuit 64 via conductor 84. In a preferred embodiment, sensor 56 is a Dickey John production radar with an output frequency resolution Rd of 44.21 Hz/mph, and the ground speed in mph is equal to the radar frequency in Hz divided by Rd. Alternatively, speed sensor 52 could be used to measure ground speed since it senses the rate of rotation of a non-driven front wheel 14 of tractor 10. As another alternative, ground speed sensor 56 could sense the rate of rotation of an optional non-driven fifth wheel (not shown) of tractor 10 used for sensing ground speed. Ground speed sensor 56 could also sense laser beam signals or externally-generated signals (e.g., signals relayed to tractor 10 from an external radar station) to measure the speed of tractor 10 with respect to the ground.

Control system 46 may also receive sequential signals from a satellite positioning system such as the Global Positioning System (GPS) or from other transmitting devices. A receiving circuit may generate position signals representative of the position of tractor 10 based upon received signals. Control circuit 64 may determine the ground speed of tractor 10 based upon sequential position signals. The ground speed is equal to the change between sequential positions divided by elapsed time (i.e., velocity equals the time derivative of position). An appropriate signal processing algorithm such as a filter may be used. A differential GPS (DGPS) receiver may also be included for receiving DGPS correction signals transmitted by the Coast Guard and service providers such as Chance Corp. Control circuit 64 may use DGPS signals to correct for the selective availability error currently added to GPS signals. DGPS may not be needed if selective availability is no longer used.

The GPS receiver may be used as ground speed sensor 56, or may be used in addition to ground speed sensor 56. If control system 46 includes a GPS receiver and a separate ground speed sensor 56, then control circuit 64 may include logic to select a ground speed signal from either source. For example, the ground speed signal from sensor 56 could be selected if the GPS signal is received from less than a minimum number of satellites, or if the GPS signal fails a validation test (e.g., the signal is out of range).

The GPS ground speed signal may be used by control system 46 to control a vehicle function or to adjust an operating parameter. For example, the GPS ground speed signal may be used as an input for the slip control function described below, or for controlling the position of implement 44, the feed rate of seeds or fertilizers or other vehicle functions. The GPS ground speed signal may also be displayed to the operator via a display, or may be combined with other parameters and then displayed. For example, the GPS ground speed signal could be combined with a fuel flow signal to display fuel efficiency data. The display could also indicate the number of satellites from which GPS data is being received.

In addition, GPS signals may be used by control system 46 to sense the acceleration of tractor 10. The acceleration is equal to the change between sequential speed signals divided by elapsed time (i.e., velocity equals the time derivative of speed). Acceleration signals may also be used to control a vehicle function or to adjust an operating parameter.

In a control system equipped for slip control, sensor 54 measures the apparent speed of tractor 10 by sensing the rate of rotation of a driven wheel 16. The difference between the apparent speed of tractor 10 measured by sensor 54 and the ground speed of tractor 10 measured by sensor 56 is representative of the amount of wheel slippage. Sensor 54 may be coupled to driven wheel 16, or to the tractor axle which drives wheel 16.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, it should be understood that other, additional sensors may be provided on tractor 10 for additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function. Alternatively, control system data may be transmitted across a communication interface between multiple control circuits located in different regions of tractor 10. The data may be representative of sensed parameter values, command or reference values, actuator command values and other data. For example, sensor data received by one control circuit may be transmitted across the communications interface for use by other control circuits. The controllers may operate in a master-slave or PEER-to-PEER configuration, and the communications interface may include a CAN databus.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 and generates a position signal representative thereof This position signal is conveyed to control circuit 64 via a conductor 86. Draft load sensors 60 and 62, which typically include resistance strain gauges applied to links 40 of hitch assembly 38, generate draft load signals representative of the force exerted on links 40. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40. When tractor 10 is stopped and implement 44 is in a lifted position, the load sensed by sensors 60 and 62 is representative of the weight of the implement. During travel of tractor 10 with implement 44 in a lifted position, the load sensed by sensors 60 and 62 is representative of the weight of implement 44 as modified by dynamic forces exerted by implement 44 on the hitch assembly 38, such as forces due to accelerations and oscillations of implement 44.

In addition to sensed values of the operating parameters discussed above, control circuit 64 receives command or reference values from command devices 66, 68, 70 and 72, which typically include potentiometers and switches positionable via suitable knobs or handles (not shown). For the purposes of implement position control, command device 66 provides an implement position command signal representative of the desired position of implement 44. Command device 68 provides a draft command value representative of the desired level of draft force on implement 44. Command device 70 is an operator adjustable upper limit selector for setting the upper limit of implement position. Finally, command device 72 is an implement position override switch that includes a working position and a lifting position. Other command devices could provide other command inputs for control of various functions of tractor 10. Signals from devices 66, 68, 70 and 72 are applied to control circuit 64 via conductors 92, 94, 96 and 98, respectively. Based upon the reference values supplied by command devices 66 through 72 and upon the sensed values from sensors 48 through 62, control circuit 64 generates control signals for raising and lowering implement 44 and applies these control signals to valving 34 via conductor 100 to move actuator 36.

In a control system equipped for slip control, control circuit 64 also receives a command from command device 102. As described below in relation to FIG. 9, command device 102 is used for turning a slip control function on and off and for setting a slip limit, and is also referred to herein as the slip rocker switch. Command device 102 is preferably a three-position rocker switch selectively movable between OFF, ON and SET positions. The SET position of command device 102 is accessible from the ON position and is a momentary position maintained as long as the operator holds command device 102 in the SET position. A signal indicative of the position of command device 102 is applied to control circuit 64 via conductor 104.

The slip control system also includes a slip indicator lamp 106. As explained below, lamp 106 is activated by a signal supplied by control circuit 64 via conductor 108 when the slip control override function described below raises hitch assembly 38.

Control system 46 also includes a display 110 controlled by control circuit 64 via conductor 112. Display 110 may be adapted to display various parameters including the ground speed of tractor 10.

Figure 2:
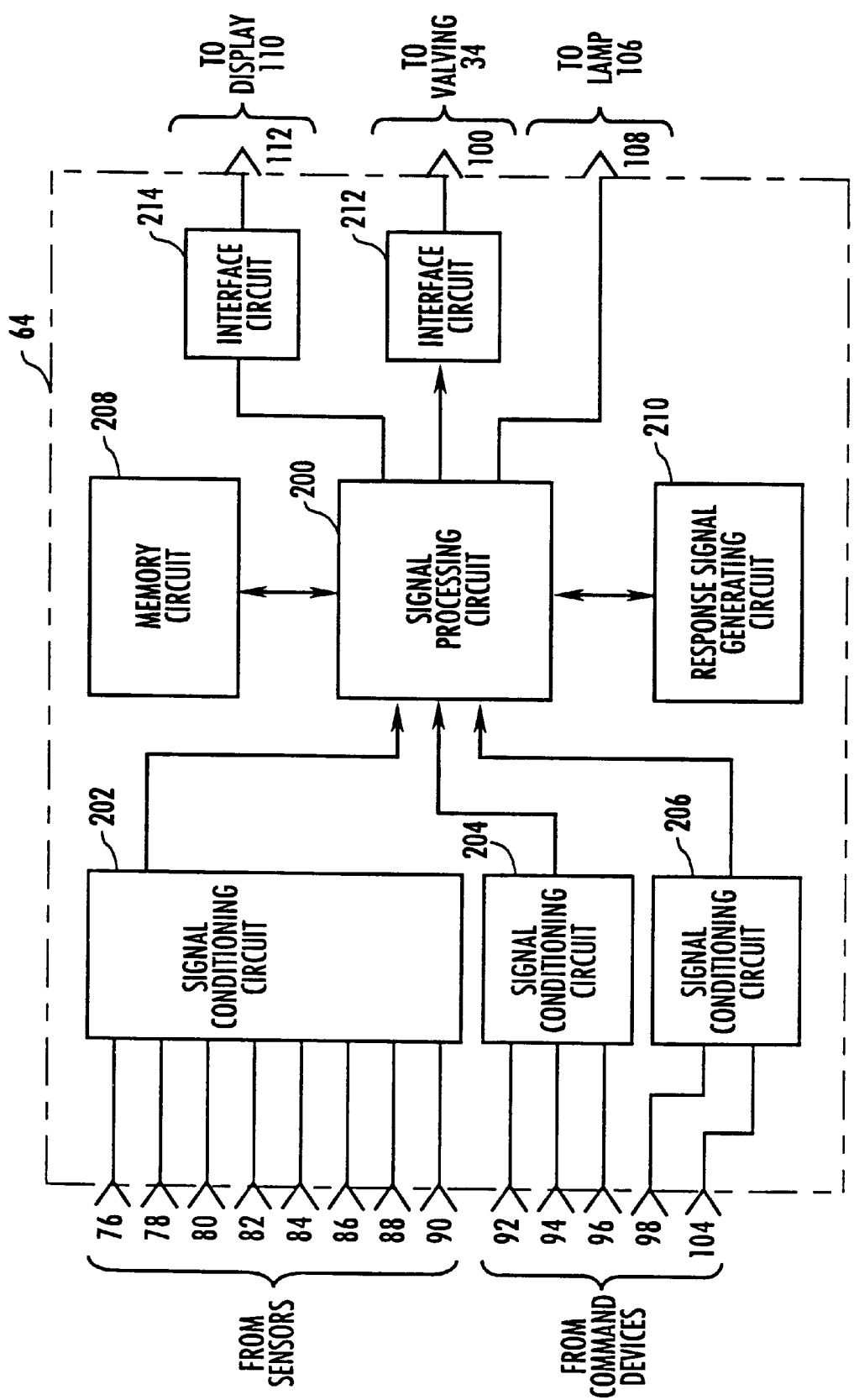
FIG. 2 is a block diagram illustrating certain of the principle circuits included in the controller for the system shown in FIG. 1.

Certain of the sub-circuits included in control circuit 64 are illustrated diagrammatically in FIG. 2. Control circuit 64 includes signal conditioning circuits 202, 204 and 206, a memory circuit 208, a signal processing circuit 200, a response signal generating circuit 210 and an output signal interface circuit 212. While these various circuits are illustrated in FIG. 2 as separate, interconnected elements, it should be understood that all or some of these circuits may be included in a single integrated circuit and may comprise internal circuitry of an appropriately configured (e.g., programmed) microprocessor.

Input signals transmitted from sensors to control circuit 64 via conductors 76 through 90 are applied to signal processing circuit 200 through signal conditioning circuit 202, which will typically include an analog-to-digital converter and appropriate isolation, depending upon the type of sensors utilized and the nature of the signals produced. Similarly, signals transmitted from command devices to control circuit 64 via conductors 92, 94 and 96 are applied to signal processing circuit 200 via signal conditioning circuit 204, which may be substantially identical to circuit 202 and generally includes an analog-to-digital converter. Moreover, circuits 202 and 204 may be a single circuit. Circuits 202 and 204 receive the input signals from the sensors and command devices, produce digital signals or values representative of the various input signals and apply these values to signal processing circuit 200. Circuit 206 receives command input signals from other command devices, such as from device 72 via conductor 98 and from device 102 via conductor 104, which generally produces discrete (e.g., on/off) signals for controlling operation of signal processing circuit 200. Circuit 206 typically includes a multiplexer and appropriate isolation, permitting signal processing circuit 200 to select and access signals applied to circuit 206.

Memory circuit 208 preferably includes both volatile and non-volatile memory, such as random access memory (RAM), electronically programmable read only memory (EPROM), electronically erasable programmable read only memory (EEPROM) and/or FLASH memory. The volatile memory of circuit 208 is generally used to store various parameter and intermediate values used during the control functions of signal processing circuit 200. Non-volatile memory, such as EPROM, serves to store the cyclic control routine implemented by signal processing circuit 200, while other non-volatile memory, such as EEPROM, serves to store the calibration values and failure signals indicative of failure or non-responsiveness of system components. Response signal generating circuit 210, which will typically be included in the circuitry of signal processing circuit 200, but is illustrated as a separate circuit here for explanatory purposes, receives values representative of sensed implement position and sensed implement draft or load and generates a response signal to control the movement of implement 44 as described more fully below. This response signal is applied to signal processing circuit 200 to adjust control signals generated by circuit 200. These adjusted control signals, in the form of pulse-width-modulated (PWM) output signals, are applied to output signal interface circuit 212, which includes appropriate valve drivers for energizing the solenoids of valving 34 and thereby to move actuator 36 in the desired direction and at a desired rate. It should be noted that the adjusted control signals produced by circuit 200 could have forms other than PWM signals and, where actuators other than hydraulic cylinders and the like are used for moving the implement, these control signals are, of course, adapted for the particular actuator type used. Circuit 200 also produces a control signal which is applied to lamp 106 via conductor 108. This control signal activates lamp 106 to provide on/off control, and control circuit 64 may include an appropriate interface (not shown) for driving lamp 106. Control circuit 64 also includes an appropriate interface 214 for driving display 110.

Figure 3:
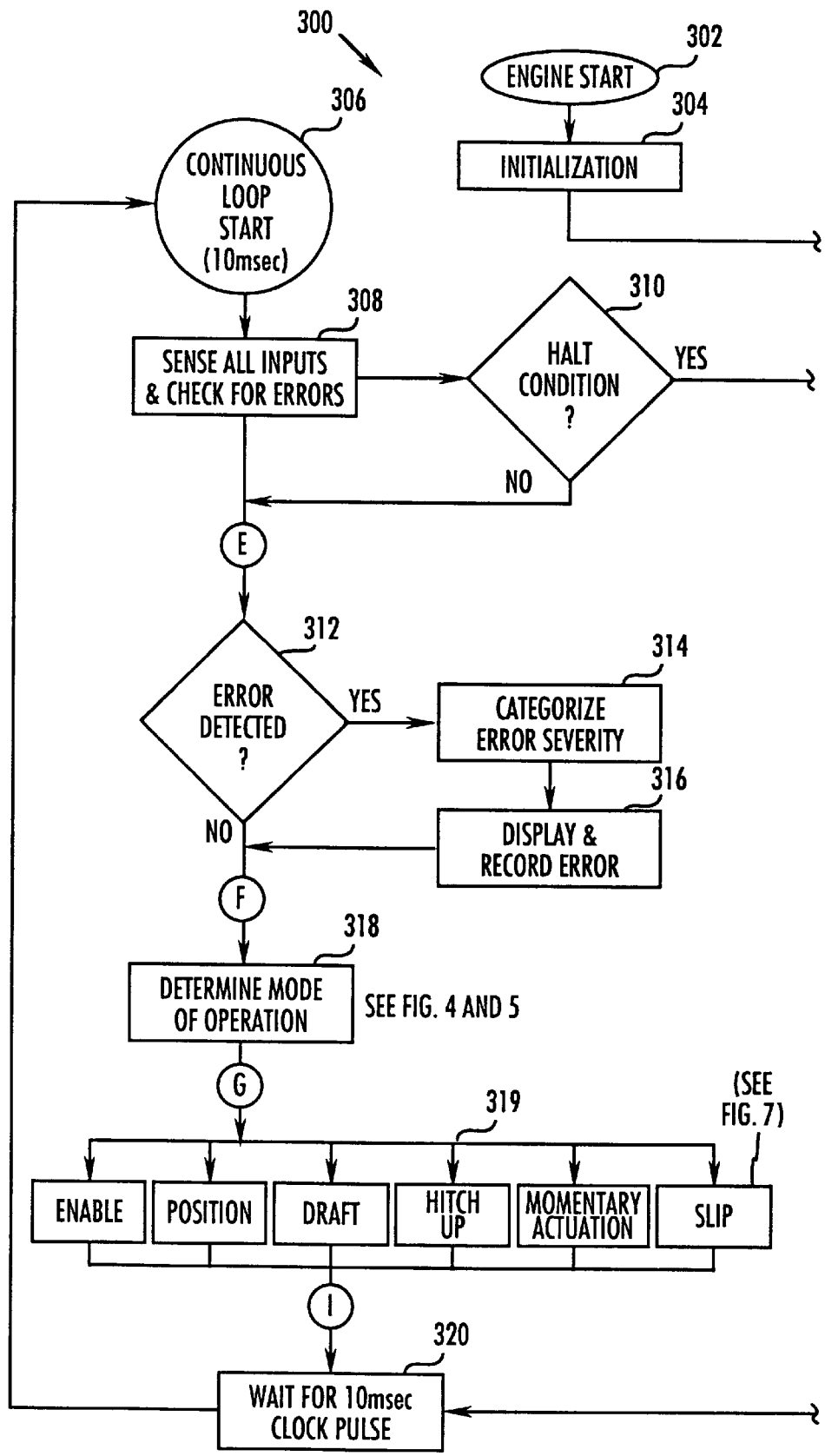
FIG. 3 is an overview flow chart generally representing typical control logic implementing an implement control approach including a slip state of operation.

The control system operates under the influence of a control algorithm executed by control circuit 64. The control algorithm 300 designated generally as 300 is schematically represented in the flow chart shown in FIG. 3. The control system is preferably enabled concurrently with starting the engine 24 of tractor 10 at step 302. At step 304, variables and hardware are initialized, and thereafter control circuit 64 enters a continuous timed closed loop or cycle at step 306. During step 308, all of the inputs to the control circuit 64 are sensed and checked for errors. Certain failures may prevent operation of control circuit 64 and cause the control system to halt, as shown generally at step 310. The severity of other detected errors are categorized and appropriate error messages are displayed and recorded as shown generally at steps 314 and 316.

After evaluating whether the control system has errors and categorizing the severity of errors detected, control circuit 64 determines the mode of operation at step 318. In a preferred embodiment, hitch assembly 38 is operable in any one of a plurality of states including ENABLE, POSITION, DRAFT, HITCH UP, MOMENTARY ACTUATION and SLIP. The logic involved at step 318 for determining the state of operation of hitch assembly 38 are described in detail in U.S. Pat. No. 5,421,416 and, when the control system is configured for slip control, include the steps described below in relation to FIG. 4 and FIG. 5. Operation in the ENABLE, POSITION, DRAFT, HITCH UP and MOMENTARY ACTUATION states is also described in detail in U.S. Pat. No. 5,421,416. Operation in the SLIP state of operation is described below in relation to FIG. 7. The control circuit 64 waits for the next 10 msec clock pulse at step 320 after completing a cycle of control algorithm 300.

Figure 4:
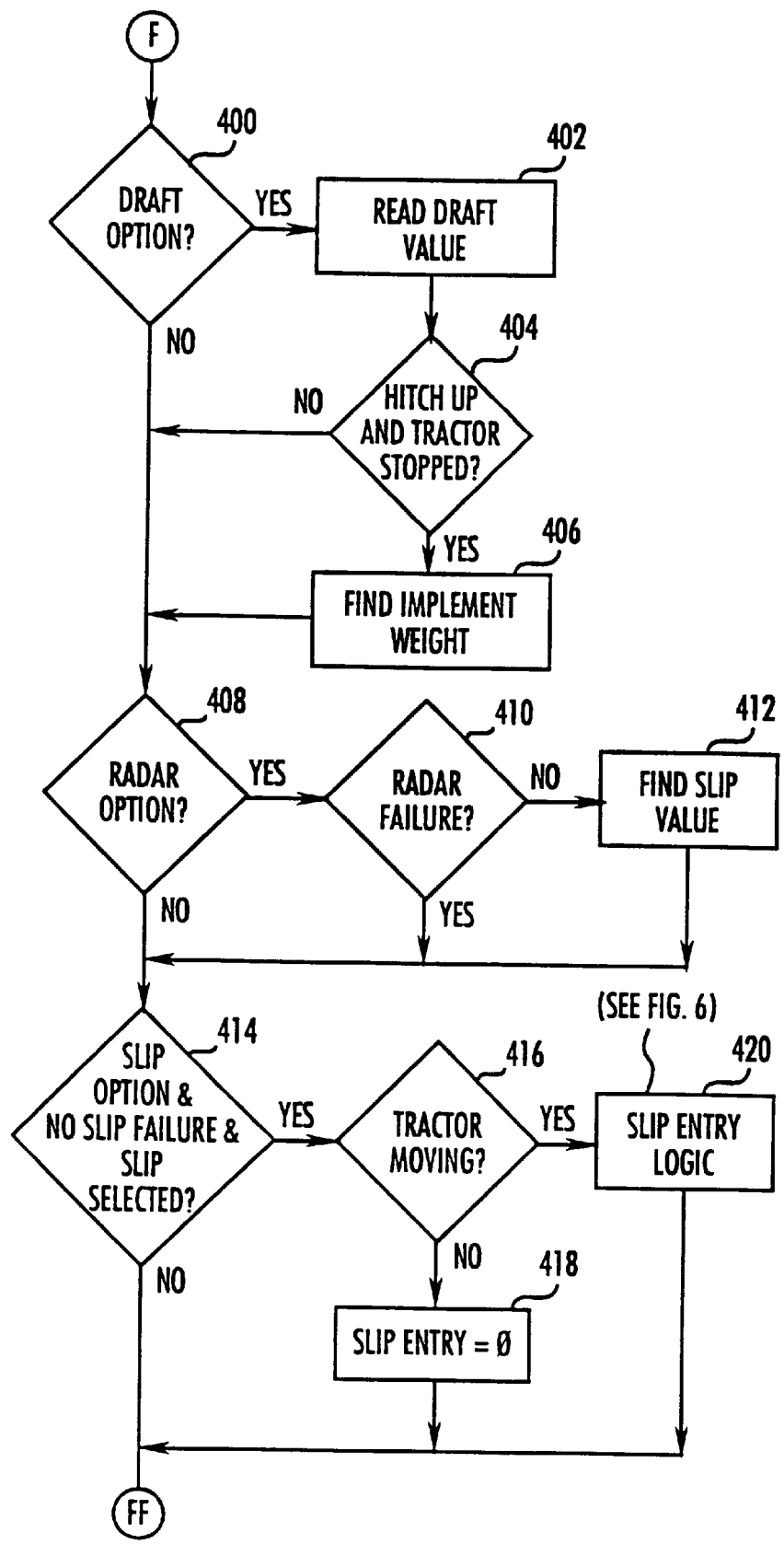
FIG. 4 is a flow chart generally representing typical control logic used after point "F" of FIG. 3 to determine whether the conditions required to execute the slip entry logic of FIG. 6 are present.

Referring to the flow chart shown in FIG. 4, control circuit 64 determines whether the control system is equipped with draft force sensors 60 and 62 at step 400. If so, control circuit 64 reads the draft force values from sensors 60 and 62 at step 402. Control circuit 64 also determines signals representative of implement weight when tractor 10 is stopped and hitch assembly 38 is in a raised position as illustrated at step 404. These conditions are generally verified by reference to a speed signal from one of speed sensors 52, 54 or 56 and to a position signal from position sensor 58. When these conditions are met, the draft force values read at step 402 are used to find implement weight at step 406. While the draft force signals do not normalize or directly measure implement weight, the weight signals are representative of (e.g., proportional to) the weight of the implement.

At step 408, control circuit 64 determines whether the control system is equipped with a ground speed sensor 56. If so, and if ground speed sensor 56 is not failed as determined at step 410, a slip signal is determined at step 412. Generally, the slip signal is calculated as the difference between the apparent speed of tractor 10 measured by sensor 54 and the ground speed of tractor 10 measured by sensor 56. In the presently preferred embodiment, the slip signal is calculated as a slip percentage using the following formula:

$$\%\text{slip}=(NW-NR)*100/NW$$

where "NW" is the tractor's apparent speed (e.g., in mph) and "NR" is the tractor's ground speed (e.g., in mph). This equation can also be expressed as:

$$\%slip = 100 - (radar\_frequency * slip\_factor)/(wheelspeed\_in * tire\_size)$$

where "%slip" is the slip percentage, "radar_frequency" is the radar frequency in Hz from ground speed sensor 56, "slip_factor" is a constant with a value dependent on the tractor family, "wheelspeed_in" is the frequency in Hz from apparent speed sensor 54, and "tire_size" is the static loaded radius of rear wheel 16 (e.g., in inches). The slip factor constant is calculated using the formula:

$$slip\_factor = 100/(Rd * slip\_factor\_1)$$

where "Rd" is the radar output frequency resolution in Hz and "slip_factor_1" is calculated using the formula:

$$slip\_factor\_1 = (1/K4) * 3600 * 2 * \pi * (1/12) * (1/5280)$$

where K4 is the number of pulses generated per axle rotation by sensor 54, 3600 is the number of seconds in 1 hour, 12 is the number of inches in 1 foot, and 5280 is the number of feet in 1 mile. In a preferred embodiment, K4=2220 pulses/rotation and Rd=44.21 Hz/mph yielding a slip_factor_1= 0.00016081 and a slip_factor of 14066. Filtering is used to provide a filtered slip percentage.

At step 414, control circuit 64 determines if tractor 10 is equipped for slip control, no slip failures are detected and slip is selected. Generally, tractor 10 is recognized as being equipped for slip control if the control system includes apparent speed sensor 54, ground speed sensor 56 and slip rocker switch 102. A failure in any of these components may inhibit the system's ability of controlling slip unless sensors providing equivalent information are provided. To permit the slip override function, a vehicle operator selects slip control by setting slip rocker switch 102 in the ON position as described further below. If the conditions at step 414 are met, control circuit 64 determines at step 416 if tractor 10 is moving. If not, the slip entry timer is cleared at step 418 and the slip control function is not available. If tractor 10 is moving, control circuit 64 executes the slip entry logic 420 described below in relation to FIG. 6 to determine if the slip state of operation should be entered. After executing the slip entry logic at step 420, or after detecting that slip control is not available at steps 414 or 416, the program continues with the enable override logic shown in the flow chart of FIG. 5.

Figure 5:
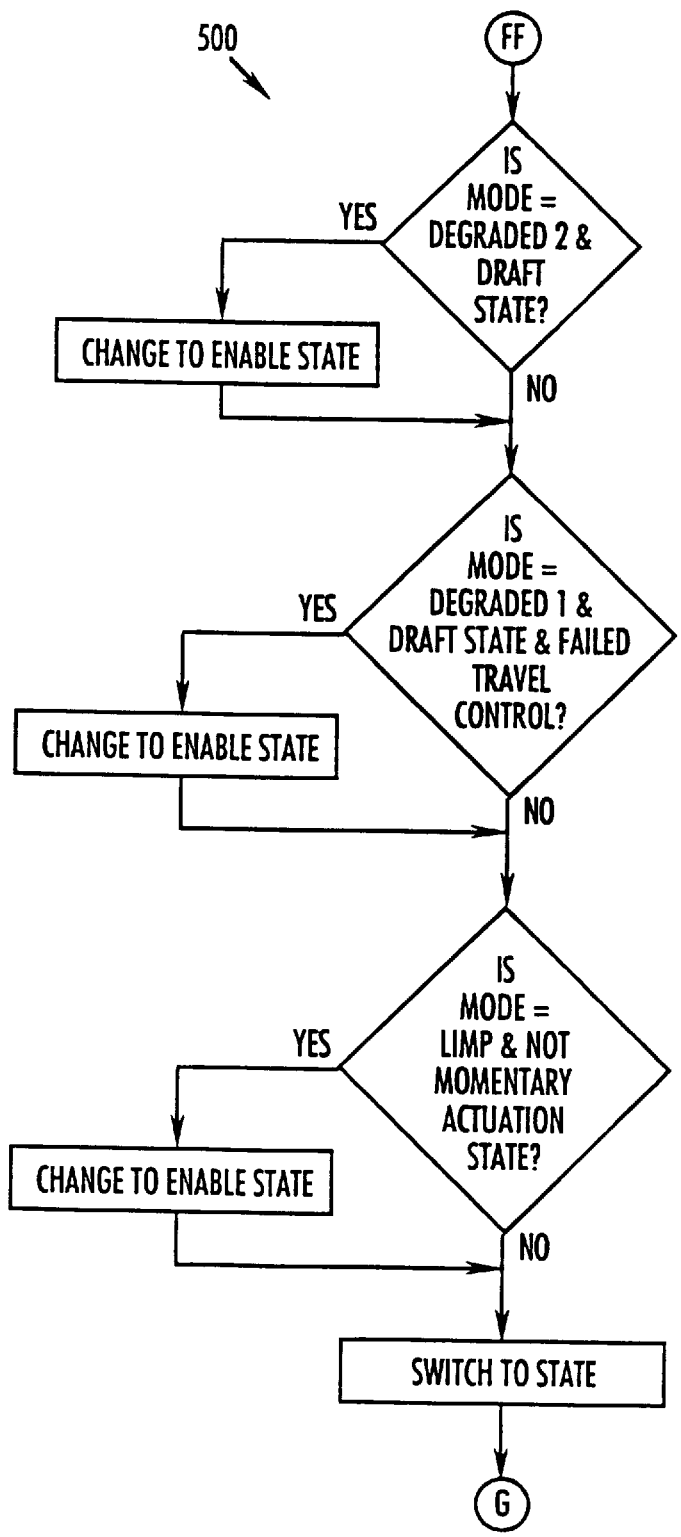
FIG. 5 is a flow chart generally representing typical control logic used after point "FF" of FIG. 4 to determine whether to change to an enable state.

Referring to FIG. 5, the enable override logic 500 is generally used to change the operation of the control system into the ENABLE state. This logic is described in detail in U.S. Pat. No. 5,421,416 and is shown herein only to complete the sequence of steps from FIG. 4 back to point "G" in FIG. 3.

Figure 6:
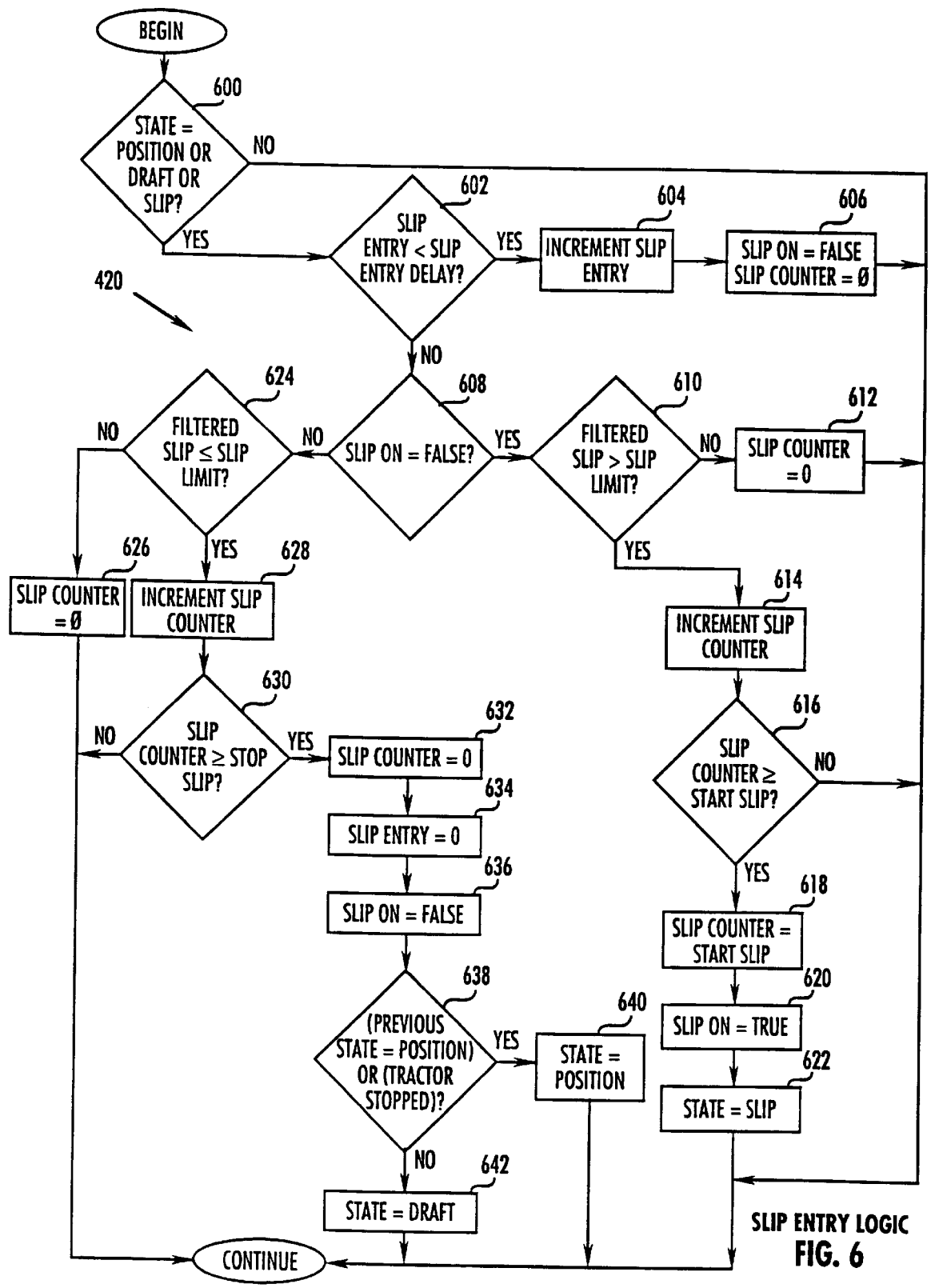
FIG. 6 is a flow chart generally representing typical control logic used to determine whether the conditions to execute in a slip state are present.

The slip entry logic 420 is shown in the flow chart of FIG. 6. If the control system is not operating in the POSITION, DRAFT or SLIP state, step 600 of the slip entry logic 420 prevents entry into SLIP state and exits. Thus, in this preferred embodiment, slip limit control is available only if tractor 10 is controlling based on the position or draft operating parameters when excessive slip occurs. If the current state is POSITION, DRAFT or SLIP, the slip entry logic delays entry into SLIP state for a predetermined period of time (SLIP ENTRY DELAY) after tractor 10 begins to move as shown at step 602. SLIP ENTRY DELAY preferably is set to prevent slip control in response to relatively high wheel slip which typically occurs during initial acceleration of tractor 10 from a standstill condition, and in the presently preferred embodiment is set to ten 10 millisecond counts, or 100 milliseconds. The SLIP ENTRY timer is incremented with each pass of the logic at step 604 until the requisite delay has occurred. During the delay, step 606 clears a flag to indicate that excessive slip has not been detected (SLIP ON=FALSE) and resets a SLIP COUNTER used as described below.

If excessive slip has not already been detected (i.e., SLIP ON=FALSE), the filtered slip is compared to a slip limit as shown at steps 608 and 610. If filtered slip does not exceed the slip limit, the SLIP COUNTER is cleared at step 612 and control circuit 64 exits the slip entry logic. If filtered slip exceeds the slip limit, the SLIP COUNTER increments at step 614 and is used to determine whether the high slip condition has persisted for a predetermined period of time (START SLIP) at step 616. START SLIP is preferably set to prevent erroneous transition into SLIP state due to noise or a short duration wheel slippage, and in the presently preferred embodiment is set to ten 10 millisecond counts, or 100 milliseconds. Control circuit 64 exits the slip entry logic if the high slip condition has not persisted for the requisite time period, thereby preventing entry into SLIP state. Once the START SLIP delay time expires, SLIP COUNTER is limited to START SLIP at step 618, a flag is set at step 620 to indicate that excessive slip has been detected (i.e., SLIP ON=TRUE), and the operational state of control circuit 64 is set to SLIP at step 622 to cause entry into the SLIP state.

If excessive slip has already been detected (i.e., SLIP ON=TRUE) at step 608, the filtered slip is compared to a slip limit at step 624. If filtered slip remains above the slip limit, SLIP COUNTER is cleared at step 626 and control circuit 64 exits the slip entry logic. Thus, SLIP override state remains active as long as high wheel slippage is occurring. However, if filtered slip no longer exceeds the slip limit, the SLIP COUNTER increments at step 628 and is then used to determine whether the high slip condition has ceased and has remained absent for a predetermined period of time (STOP SLIP) at step 630. STOP SLIP is preferably set to prevent erroneous transition out of SLIP state due to noise or a short interruption of a high slip condition, and in the presently preferred embodiment is set to ten 10 millisecond counts, or 100 milliseconds. Control circuit 64 exits the slip entry logic if the high slip condition has not remained absent for the requisite time period, thereby preventing exit from SLIP state. Once the STOP SLIP delay time passes, SLIP COUNTER is cleared at step 632, the slip entry timer is cleared at step 634, and a flag is cleared to indicate that excessive slip is no longer detected at step 636. At steps 638 through 642, control circuit 64 sets state to POSITION if the previous state was POSITION or tractor 10 is stopped, and otherwise sets state to DRAFT. Thus, control circuit 64 returns to the same parameter control basis prevailing prior to entry into the wheel slippage override control routine.

In a preferred embodiment, the slip limit used at step 624 to exit slip control equals the slip limit used at step 610 to enter slip control. Alternatively, the slip limit used to exit slip control could be less than the slip limit used for entry, so as to provide hysteresis between slip override routine entry and exit.

Figure 7:
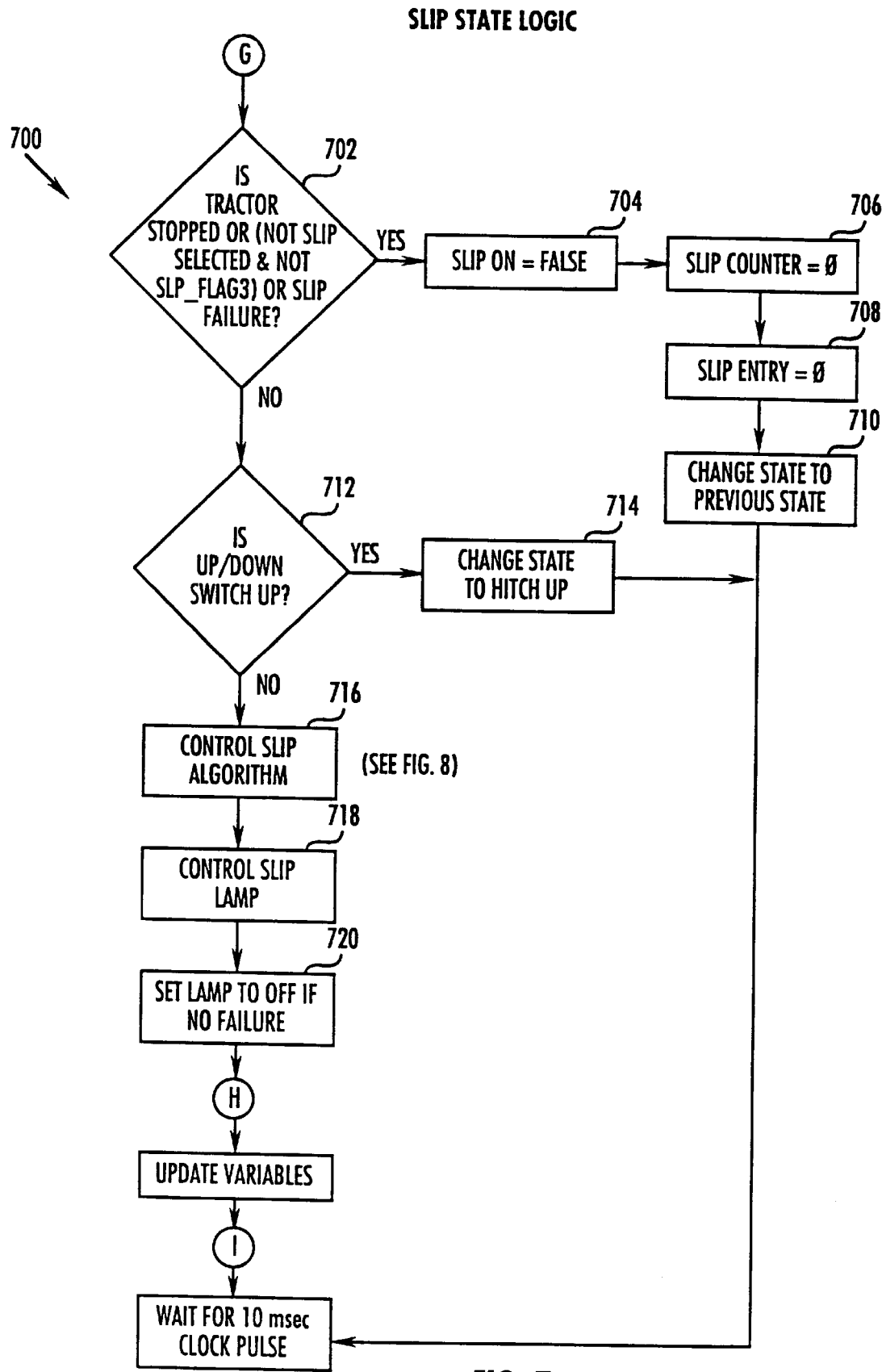
FIG. 7 is a flow chart generally representing typical control logic used in a slip state to determine when to execute a control slip algorithm.

Referring to FIG. 7, control circuit 64 executes SLIP state logic 700 when SLIP state is selected by the slip entry logic 420 of FIG. 6 and is not overridden by the enable override logic 500 of FIG. 5. As shown at step 702, the control slip algorithm is not executed if the tractor is stopped, slip is not selected by slip rocker switch 102, or a slip failure occurred. Instead, in such situations, SLIP ON is set to FALSE, SLIP COUNTER and the slip entry timer are cleared, and state is changed to the previous state of operation as shown at steps 704 through 710, and the control waits for the next 10 msec clock pulse. Moreover, state is changed to HITCH UP if UP/DOWN switch 72 is in the UP position as shown at steps 712 and 714, and the control waits for the next 10 msec clock pulse. Otherwise, the control system executes the control slip algorithm 716 as described below in relation to FIGS. 8A and 8B, and controls illumination of slip lamp 106. Slip lamp 106 is activated only when the control slip algorithm raises hitch assembly 38. At step 720, the system indicator lamp (not shown) is turned OFF if there have been no failures of the system.

Figure 8A:
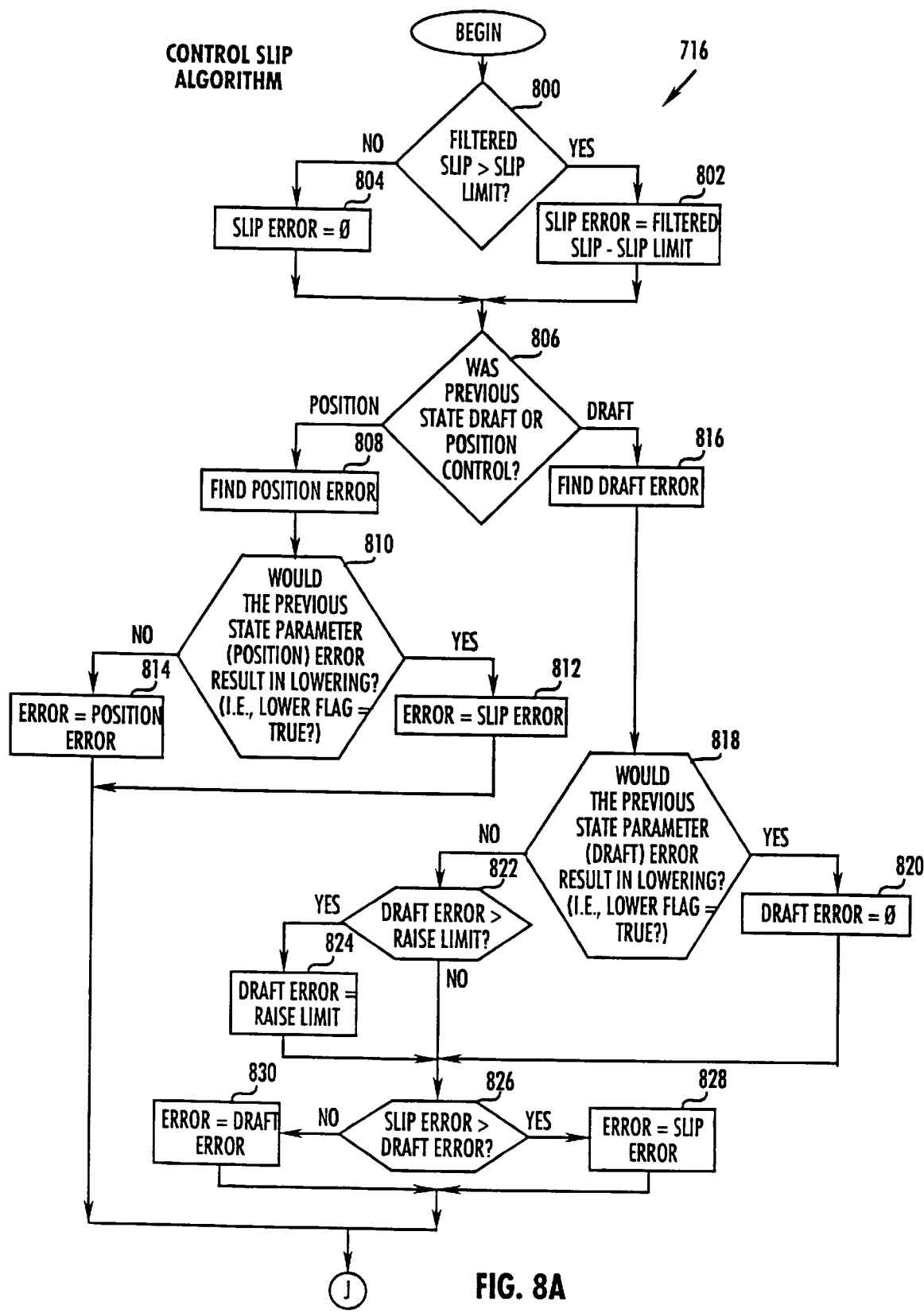
FIGS. 8A and 8B are a flow chart generally representing typical control logic used in a control slip algorithm.
Figure 8B:
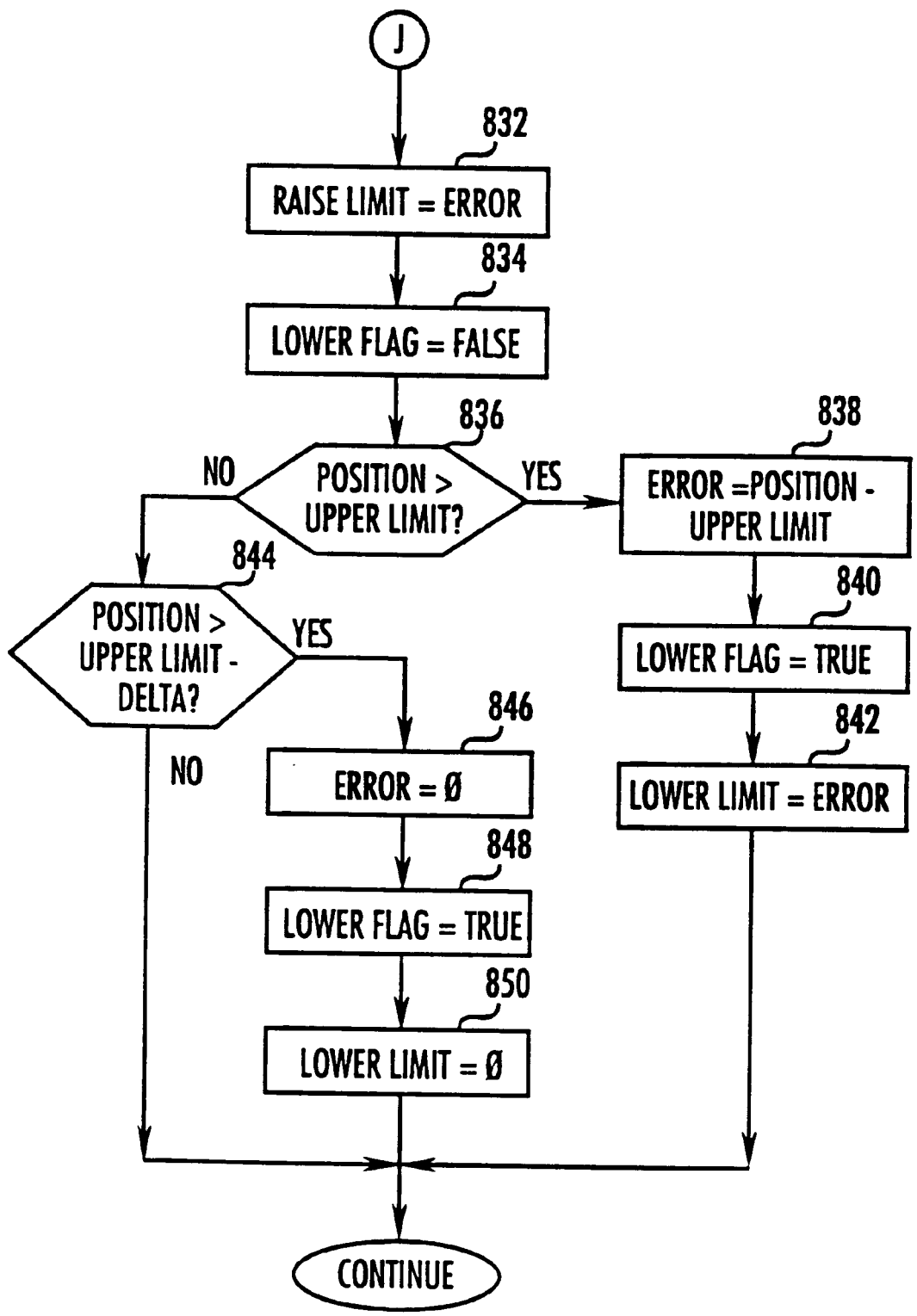

A presently preferred slip control algorithm 716 is shown in FIGS. 8A and 8B. In accordance with the logic shown in FIGS. 8A and 8B, control circuit 64 detects whether excessive slip is occurring by comparing filtered slip to the slip limit at step 800. If filtered slip exceeds the slip limit, a value called slip error is set equal to the difference between filtered slip and slip limit at step 802. It should be noted that a slip reference value different from the slip limits used to enter and exit the slip state could also be used for this purpose. In addition, slip error could be set to any other value that would result in raising implement 44 (e.g., a constant). If filtered slip does not exceed the slip limit, slip error is set to 0 at step 804.

At step 806, control circuit 64 determines the previous operating parameter used to control the position of hitch assembly 38. At step 808, if the previous state was POSITION, a position error value is determined as the difference between the sensed implement position from sensor 58 and a position reference value set by the operator using command device 66. At steps 810 through 814, the error signal is set equal to slip error value if the previous state parameter error (i.e., position error) would result in lowering the implement, and is set equal to position error value if the previous state parameter error would result in raising. Thus, slip error value is used to generate the control signal to the actuator (subject to the upper limit logic of steps 836–850, described below) only if the normal operating parameter (position) would result in lowering.

If the previous state was found to be DRAFT at step 806, control circuit 64 determines a draft error value at step 816 based upon the difference between sensed draft force from sensors 60 and 62 and a draft reference value set by the operator using draft force command device 68. As shown at steps 818 through 824, the draft error value is set to 0 if the previous state parameter error value (i.e., draft error) would result in lowering the implement, and the draft error value limited if the previous state parameter error value would result in raising the implement. The error signal is set equal to the greater of the slip error value and the draft error value at steps 826 through 830. Thus, slip error value is used to generate the control signal (subject to the upper limit logic) only if the normal operating parameter (draft) would result in lowering the implement and only if use of the slip error value would result in raising the implement faster than would use of the draft error value.

The raise limit is set to the error signal at step 832 and the lower flag is set to FALSE at step 834 before execution of the upper limit logic of steps 836 through 850. The upper limit logic determines whether implement position is greater than the upper limit set by the operator using upper limit command device 70. If so, steps 838 through 842 set the error signal equal to the difference between implement position and the upper limit, set the lower flag to TRUE, and set the lower limit signal equal to the error signal. Thus, the control signal does not depend on the slip signal when implement position is above the upper limit. As shown at step 844, if implement position does not exceed the upper limit, the error signal is not changed if implement position is not within a dead-band of the upper limit. The dead-band width is represented by the value DELTA, and in the presently preferred embodiment is set to a number of digital counts equal to approximately 1 degree of movement. If implement position is within the dead-band region, the error signal is set to 0, the lower flag is set to TRUE, and the lower limit signal is set equal to 0 at steps 846 through 850. Thus, the control signal also does not depend on the slip signal when implement position is within a predetermined proximity to the upper limit.

Figure 9:
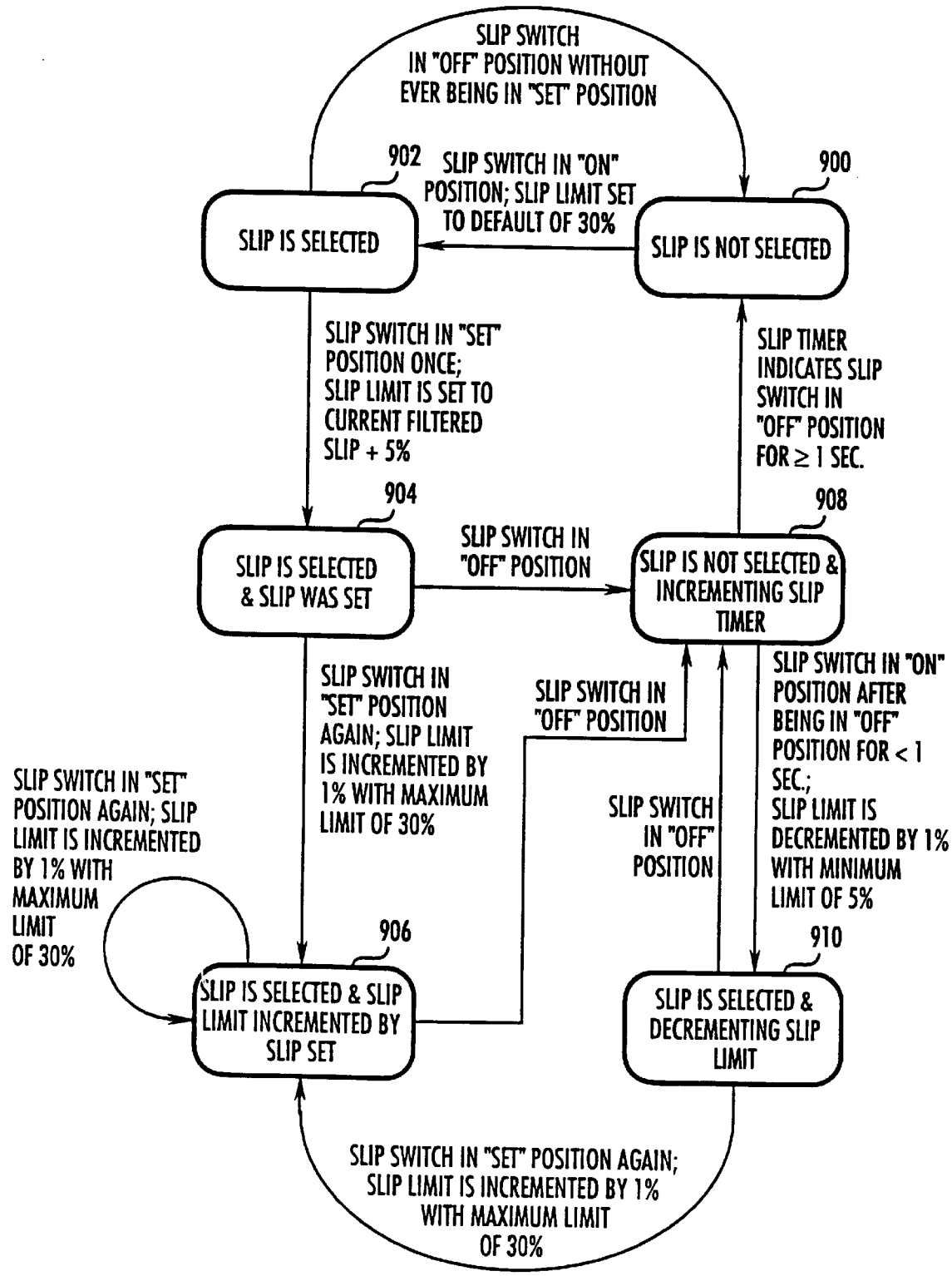
FIG. 9 is a transition state diagram generally representing how the control system turns a slip override function on and off, and how the control system calculates a slip limit.

The operation of command device 102 (i.e., the slip rocker switch) for turning the slip function on and off, and for setting the slip limit or reference value, is described in relation to the slip limit transition state diagram shown in FIG. 9. Initially, the control system is in the SLIP IS NOT SELECTED state 900 with the slip rocker switch 102 in the OFF position. No slip limit function is available in state 900. The control system transitions to the SLIP IS SELECTED state 902 when the operator initially moves slip rocker switch 102 into the ON position after determining that slip limit control is desired. In response to movement of switch 102, the slip limit is set to a default value, such as 30%.

The control system transitions back to state 900 if the operator thereafter moves slip rocker switch 102 back to the OFF position without having moved it to the SET position. However, if the operator moves slip rocker switch 102 to the momentary SET position while in state 902, the control system transitions to the SLIP IS SELECTED AND SLIP WAS SET state 904. The first movement of slip rocker switch 102 to the SET position sets the slip limit to a slip value plus a constant, preferably to the current filtered slip value plus 5%. The operator will typically initially move slip rocker switch 102 to the ON position and then directly to the SET position when tractor 10 is operating properly and slip limit control is desired. However, the slip limit cannot be set if the tractor is stopped or implement position is at or near the upper limit. In a preferred embodiment, the slip limit cannot be set if implement position is within 10% of total allowable travel from the upper limit position.

From state 904, the operator may increment the slip limit subject to a maximum limit by pushing slip rocker switch 102 to the SET position again, causing the control system to transition to the SLIP IS SELECTED & SLIP LIMIT INCREMENTED BY SLIP SET state 906. In a preferred embodiment, the slip limit is incremented in 1% steps and the maximum limit is 30%. Each subsequent push of slip rocker switch 102 to the SET position increments the slip limit by 1% subject to the maximum limit as the control system remains in state 906.

From either state 904 or state 906, movement of slip rocker switch 102 to the OFF position causes the control system to transition to the SLIP IS NOT SELECTED & INCREMENTING SLIP TIMER state 908. State 908 includes a timer for timing the period during which slip rocker switch 102 remains in the OFF state. After a predetermined time, preferably 1 second, the control system transitions back to state 900 and the slip limit function is turned off. However, if the slip rocker switch is in the OFF position for less than 1 second before being toggled to the ON position, the control system transitions to the SLIP IS SELECTED & DECREMENTING SLIP LIMIT state 910, and the slip limit is decremented by a predetermined amount, subject to a minimum limit. In a preferred embodiment, the slip limit is decremented by 1% steps subject to a minimum limit of 5%. In addition, no decrement is allowed if the filtered slip signal +5% exceeds the previous slip limit. From state 910, the control system transitions back to state 908 if slip rocker switch 102 is pushed back into the OFF position. States 908 and 910 allow the operator to decrease the slip limit in steps down to the minimum limit by sequentially pushing the slip rocker switch 102 to the ON position and then to the OFF position for less than 1 second. From state 910, the control system can also transition to state 906, and increment the slip limit by 1% steps subject to the maximum limit, by pushing the slip rocker switch 102 into the SET position again.

The described structure allows an operator to turn the slip function on and off, and to set the slip limit, using a single rocker switch. However, other structures could be used. For example, a push-button switch could be used to turn the slip function on and off and a separate rocker switch could be used to increment and decrement the slip limit. Also, although the current logic sets the slip limit to current filtered slip plus a constant when slip rocker switch 102 is initially moved into the SET position, the system could also set the slip limit initially to a constant and then allow the operator to increment or decrement the slip limit.

It should be noted that the slip limit control system described above functions from both position and draft control modes. The control system limits wheel slippage in adverse traction conditions, and is typically used in conjunction with proper ballasting and/or matching of drawbar load to prevailing traction conditions. Before operating in slip limit control mode, tractor 10 is typically ballasted for prevailing traction conditions and the draft load command or position command is set such that the implement is operating at a desired depth and wheel slippage is in an acceptable range. The slip rocker switch 102 is then moved to the ON position and the slip limit is set as described above. When the slip limit is exceeded, the control system activates slip limit control and activates lamp 106 to provide an indication to the operator that the hitch is being raised to prevent the tractor from becoming stuck and to prevent excessive wheel slippage.

In the presently preferred embodiment, control circuit 64 is configured to reset the value of the slip limit upon detecting an increase in the set or reference value of the draft or load command. In operation the operator will typically set the desired slip limit value, as described above with reference to FIG. 9, when the vehicle is operating in a desired manner, e.g. at a desired draft level as set on draft command device 68 and when the level of wheel slippage feels proper. However, if the vehicle is thereafter operating in DRAFT mode and the operator adjusts the level of the draft command to a higher level, wheel slippage may occur as control circuit 64 attempts to maintain the higher draft or load level by further penetrating the implement into the soil. The increase in wheel slippage may tend to cause control circuit 64 unwantedly to enter into the slip override logic described above, unless the desired level of wheel slippage is readjusted to account for the increased level of load on the implement.

Figure 10:
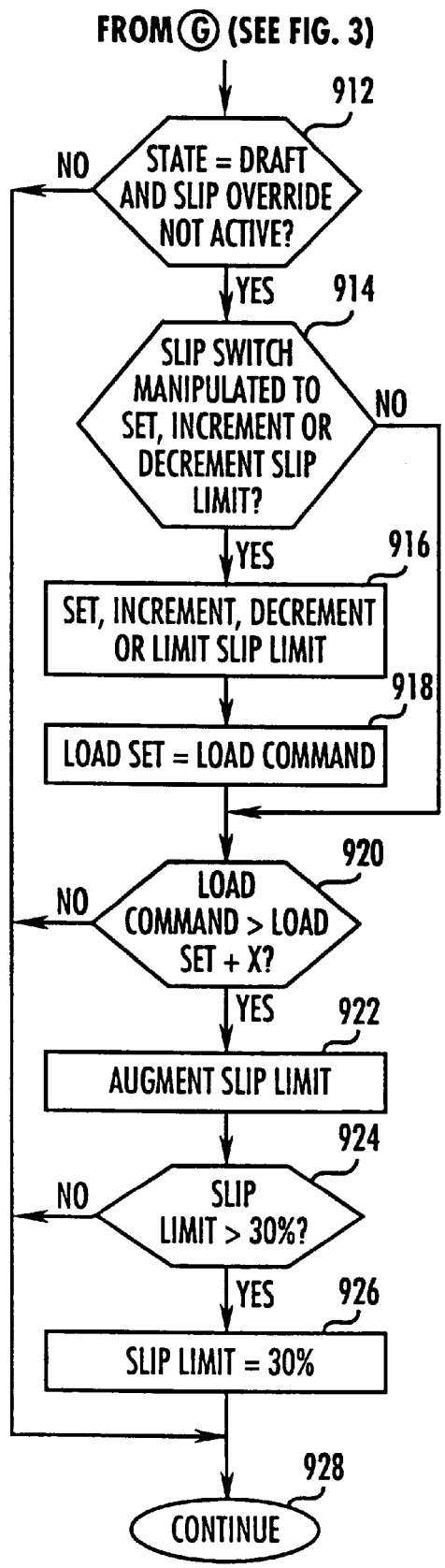
FIG. 10 is a flow chart illustrating typical control logic for resetting a slip limit value upon an operator induced increase in a draft or load command setting.

FIG. 10 illustrates typical control logic implemented by control circuit 64 to account for this need to readjust the desired wheel slippage level. As shown at step 912, control circuit 64 first checks whether the present state of operation is DRAFT and whether the slip override function is currently active. If the state of operation is not DRAFT or if the override function is active, the subsequent steps are bypassed, and control circuit 64 proceeds to step 928 to continue other control functions. If, however, control is presently in the DRAFT state and the override function is not active, the logic proceeds to step 914.

At step 914, control circuit 64 determines whether the slip switch is presently being manipulated (i.e. depressed) for setting, incrementing or decrementing the slip limit as discussed with reference to FIG. 9 above to set a desired level of wheel slippage for the override function. If the switch is being manipulated for setting the desired level of wheel slippage, the logic proceeds to step 916; if not, control circuit 64 advances again to step 920 as described below. At step 916, control circuit 64 sets, increments, decrements and limits the desired level of wheel slippage as discussed above with reference to states 904, 906 and 910. At step 918 the present value of the load (i.e. draft) command is saved in memory circuit 208 as the value LOAD SET, effectively recording the level of that parameter at the time the slip limit value is set.

At step 920 control circuit 64 reads the current value of the load command from command device 68 and compares this value to the value of LOAD SET (from step 918) plus a constant value X, such as 25 counts on a digital scale. If the value of the load command signal is greater than the LOAD SET value plus the constant adder value, control circuit 64 proceeds to step 922, otherwise the reset sequence is exited by proceeding to step 928 as before. Thus, at step 920 control circuit 64 determines whether the operator has induced an increase in the load command value of more than the constant value X. Because this increase in the load command value could cause unwanted override of the draft control function based upon an increased degree of wheel slippage, control circuit 64 augments or increases the slip limit value at step 922. Although any suitable algorithm may be employed for thus augmenting the slip limit value, in the presently preferred embodiment the slip limit value is increased at step 922 by the equation:

$$\text{slip\_limit} = \text{slip\_limit} + K * (\text{LOAD COMMAND} - \text{LOAD SET})$$

where K is a constant multiplier relating the increase in the slip limit to the increase in the load command, such as 10 counts on a digital scale.

From step 922, control circuit 64 determines whether the reset value of the slip limit exceeds the maximum allowable value of 30%. If it does, the slip limit value is rate limited to the maximum allowable value of 30% at step 926. If the slip limit value does not exceed the maximum allowable value, or following rate limiting at step 926, control circuit 64 advances to step 928 to continue control as described above, using the newly reset value for the slip limit for the slip override function. It should be noted from the foregoing reset sequence that the desired level of wheel slippage may be modified in response to adjustment of a parameter other than vehicle load, particularly of parameters capable of influencing the level of slippage. Moreover, while the reset sequence described above preferably resets the slip limit based only upon increases in the load or draft command value, additional or other parameters, such as engine speed or implement position, could be used for resetting the level of wheel slip, and the wheel slip limit could be adjusted in a similar manner based upon decreases in such command levels as well as, or instead of, increases alone.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flow charts only generally represent the steps used by the control system. Different implementations of hardware and software that fall within the scope of the appended claims would be apparent to a person of skill in the art. In addition, the disclosed system could be used to regulate wheel slippage on other types of vehicle.

What is claimed is:

1. A system for controlling wheel slippage of a vehicle carrying or trailing an implement, the implement coupled to an implement positioning system including an actuator for vertically moving the implement in response to a control signal, the system comprising:

a first sensor for sensing a first operating parameter of a machine system comprising the vehicle, the implement positioning system and the implement;

a second sensor for sensing apparent speed of the vehicle;

a third sensor for sensing ground speed of the vehicle; and a control circuit coupled to the first sensor, the second sensor, the third sensor and the actuator, the control circuit configured to generate a slip signal based at least upon the apparent speed of the vehicle and the ground speed of the vehicle and to generate the control signal for moving the implement, the control circuit further configured to operate in a first manner when the slip signal is below a first predetermined slip limit wherein control is based upon the first operating parameter and in a second manner when the slip signal is above a second predetermined slip limit wherein control is based exclusively upon any one of the first operating parameter and a slip override signal, wherein, when the control circuit is operating in the second manner, the control circuit generates the control signal for moving the actuator based upon a difference between the first operating parameter and a first reference value if the difference would result in raising the implement, and generates the control signal for moving the actuator based upon a difference between the slip signal and a slip reference value if the difference between the first operating parameter and the first reference value would result in lowering the implement.

2. The system of claim 1 wherein the actuator can selectively raise and lower the implement when the control circuit is operating in the first manner, and the actuator can only raise the implement when the control circuit is operating in the second manner.

3. The system of claim 1 wherein the first and second predetermined slip limits are equal.

4. The system of claim 1 wherein the control circuit delays a first predetermined period of time after the slip signal rises above the first predetermined slip limit before transitioning from the first manner of operation to the second manner, and delays a second predetermined period of time after the slip signal falls below the second predetermined slip limit before transitioning from the second manner of operation to the first manner.

5. The system of claim 1 wherein, when the control circuit is operating in the first manner, the control circuit generates the control signal for moving the actuator based upon a difference between the first operating parameter and a first reference value.

6. The system of claim 1 wherein, when the control circuit is operating in the second manner, the slip override signal can only raise the implement.

7. The system of claim 1 wherein, when the control circuit is operating in the second manner, the slip override signal is based upon a difference between the slip signal and a slip reference value.

8. The system of claim 1 wherein, if the difference between the first operating parameter and the first reference value would result in raising the implement, the control circuit generates the control signal for moving the actuator based upon either the difference between the first operating parameter and the first reference value or the difference between the slip signal and the slip reference value depending upon a predetermined relationship between the differences.

9. The system of claim 8 wherein the control circuit generates the control signal for moving the actuator based on the predetermined relationship between the differences of selecting the difference which will result in raising the implement faster.

10. The system of claim 1 further comprising a fourth sensor coupled to the control circuit for sensing a second operating parameter of the machine system, and wherein, when the control circuit is configured to operate in the first manner, the control circuit selectively generates the control signal for moving the actuator based upon any one of a difference between the first operating parameter and a first reference value and a difference between the second operating parameter and a second reference value.

11. The system of claim 10 wherein, when the control circuit is operating in the second manner, the slip override signal can only raise the implement.

12. The system of claim 10 wherein, when the control circuit is operating in the second manner, the slip override signal is based upon a difference between the slip signal and a slip reference value.

13. The system of claim 10 wherein, when the control circuit returns to operating in the first manner after transitioning from the first manner to the second manner, the control circuit generates the control signal for moving the actuator based upon a difference between a previously selected operating parameter used by the control circuit in the first manner and a reference value for that parameter.

14. The system of claim 10 wherein the first sensor senses implement position and the fourth sensor senses implement draft.

15. The system of claim 1 wherein the second sensor senses rate of rotation of a driven wheel of the vehicle.

16. The system of claim 1 wherein the second sensor includes a variable inductance magnetic pickup.

17. The system of claim 1 wherein the third sensor includes a radar-based speed sensor.

18. The system of claim 1 wherein the third sensor senses rate of rotation of a non-driven wheel of the vehicle.

19. The system of claim 1 wherein the third sensor includes a global positioning system receiver.

20. A system for controlling wheel slippage of a vehicle carrying or trailing an implement, the implement coupled to an implement positioning system including an actuator for vertically moving the implement in response to a control signal, the system comprising:

a first sensor for sensing a first operating parameter of a machine system comprising the vehicle, the implement positioning system and the implement;

a second sensor for sensing apparent speed of the vehicle;

a third sensor for sensing ground speed of the vehicle; and control circuit coupled to the first sensor, the second sensor, the third sensor and the actuator, the control circuit configured to generate a slip signal based at least upon the apparent speed of the vehicle and the ground speed of the vehicle and to generate the control signal for moving the implement, the control circuit further configured to operate in a first manner when the slip signal is below a first predetermined slip limit wherein control is based upon the first operating parameter and in a second manner when the slip signal is above a second predetermined slip limit wherein control is based exclusively upon any one of the first operating parameter and a slip override signal, wherein the control circuit prevents transition from the first manner of operation to the second manner until a predetermined period of time after the vehicle begins to move.

21. A system for controlling wheel slippage of a vehicle carrying or trailing an implement, the implement coupled to an implement positioning system including an actuator for vertically moving the implement in response to a control signal, the system comprising:
a first sensor for sensing a first operating parameter of a machine system comprising the vehicle, the implement positioning system and the implement;
a second sensor for sensing apparent speed of the vehicle;
a third sensor for sensing ground speed of the vehicle;
a fourth sensor for sensing a second operating parameter of the machine system; and
a control circuit coupled to the first sensor, the second sensor, the third sensor, the fourth sensor and the actuator, the control circuit configured to generate a slip signal based at least upon the apparent speed of the vehicle and the ground speed of the vehicle and to generate the control signal for moving the implement, the control circuit further configured to operate in a first manner when the slip signal is below a first predetermined slip limit wherein control is based upon the first operating parameter and in a second manner when the slip signal is above a second predetermined slip limit wherein control is based exclusively upon any one of the first operating parameter and a slip override signal, wherein, when the control circuit is configured to operate in the first manner, the control circuit selectively generates the control signal for moving the actuator based upon a difference between the first operating parameter and a first reference value or a difference between the second operating parameter and a second reference value, and, when the control circuit is operating in the second manner after transitioning from the first manner, the control circuit generates the control signal for moving the actuator based upon a difference between a previously selected operating parameter used by the control circuit in the first manner and a reference value for that parameter if the difference would result in raising the implement, and generates the control signal for moving the actuator based upon a difference between the slip signal and a slip reference value if the difference between the previously selected operating parameter and the reference value for that parameter would result in lowering the implement.

22. A system for controlling wheel slippage of a vehicle carrying or trailing an implement, the implement coupled to an implement positioning system including an actuator for vertically moving the implement in response to a control signal, the system comprising:
a first sensor for sensing a first operating parameter of a machine system comprising the vehicle, the implement positioning system and the implement;
a second sensor for sensing apparent speed of the vehicle;
a third sensor for sensing ground speed of the vehicle; and
a control circuit coupled to the first sensor, the second sensor, the third sensor and the actuator, the control circuit configured to generate a slip signal based at least upon the apparent speed of the vehicle and the ground speed of the vehicle and to generate the control signal for moving the implement, the control circuit further configured to operate in a first manner when the slip signal is below a first predetermined slip limit wherein control is based upon the first operating parameter and in a second manner when the slip signal is above a second predetermined slip limit wherein control is based exclusively upon any one of the first operating parameter and a slip override signal, wherein, when the control circuit is operating in the second manner, the control circuit generates the control signal for moving the actuator independently of the slip signal if the implement position is above a predetermined position.

23. A system for controlling wheel slippage of a vehicle carrying or pulling an implement, the implement coupled to an implement positioning system including an actuator for vertically moving the implement in response to a control signal, the system comprising:
a draft sensor for sensing force exerted by the implement on the implement positioning system;
a position sensor for sensing position of the implement;
a speed sensor for sensing apparent speed of the vehicle;
a ground speed sensor for sensing ground speed of the vehicle; and
a control circuit coupled to the draft sensor, the position sensor, the speed sensor, the ground speed sensor and the actuator, the control circuit configured to generate a slip signal based at least upon the apparent speed of the vehicle and the ground speed of the vehicle and to generate the control signal for moving the implement, the control circuit further configured to operate in a normal mode wherein the control signal applied to the actuator is selectively based upon any one of a first difference between the draft force and a draft reference value and a second difference between the implement position and a position reference value, and in a slip override mode when the slip signal exceeds a slip threshold wherein control based upon any one of the first and the second difference can be overridden by control based upon a difference between the slip signal and a slip reference value.

24. The system of claim 23, wherein the slip reference value is increased in response to an increase in the draft reference value.

25. The system of claim 23 wherein control based upon any one of the first and the second difference is overridden in slip override mode when such control would result in lowering the implement.

26. The system of claim 23 wherein, when the control circuit is operating in slip override mode and control based upon any one of the first and the second difference would result in raising the implement, the control circuit controls the actuator based upon any one of the first and the second difference.

27. The system of claim 23 wherein, when the control circuit is operating in slip override mode and control in normal mode was previously based upon draft force and the first difference would result in raising the implement, the control circuit applies a control signal to the actuator based upon the greater of the first difference and the difference between the slip signal and the slip reference value.

28. A system for controlling slip of a vehicle by controlling the elevation of an implement carried or trailed by the vehicle, the implement coupled to an implement positioning system including an actuator for vertically moving the implement in response to a control signal, the system comprising:

means for sensing a first operating parameter of a machine system comprising the vehicle, the implement positioning system and the implement;

means for sensing a second operating parameter of the machine system;

means for sensing the apparent speed of the vehicle;

means for sensing the ground speed of the vehicle; and control means coupled to the first operating parameter sensing means, the second operating parameter sensing means, the apparent speed sensing means, the ground speed sensing means and the actuator, the control means configured to generate a slip signal based at least upon the apparent speed of the vehicle and the ground speed of the vehicle, the control means further configured to generate the control signal for moving the implement selectively based upon any one of a first difference between the first operating parameter and a first reference value and a second difference between the second operating parameter and a second reference value, and to override control based upon any one of the first and the second difference with control based upon a difference between the slip signal and a slip reference value when the slip signal exceeds a slip threshold.

29. The system of claim 28, wherein the slip threshold is modified in response to modification of the first reference value.

30. A system for controlling wheel slippage of a vehicle carrying or trailing an implement, the implement coupled to an implement positioning system including an actuator for vertically moving the implement in response to a control signal, the system comprising:

a first sensor for sensing an operating parameter of a machine system comprising the vehicle, the implement positioning system and the implement;

a second sensor for sensing apparent speed of the vehicle;

a third sensor for sensing ground speed of the vehicle; and a control circuit coupled to the first sensor, the second sensor, the third sensor and the actuator, the control circuit configured to generate a slip signal based at least upon the apparent speed of the vehicle and the ground speed of the vehicle and to generate the control signal for moving the implement, the control circuit further configured to control based exclusively upon the operating parameter if the slip signal is below a first predetermined slip limit, to control based exclusively upon the operating parameter if the operating parameter would result in raising the implement when the slip signal is above a second predetermined slip limit, and to control based exclusively upon the slip signal if the operating parameter would result in lowering the implement when the slip signal is above the second predetermined slip limit.

\* \* \* \* \*